April 24, 1945. W. A. MELSOM 2,374,224
FLEXIBLE HOSE COUPLING
Filed April 10, 1942
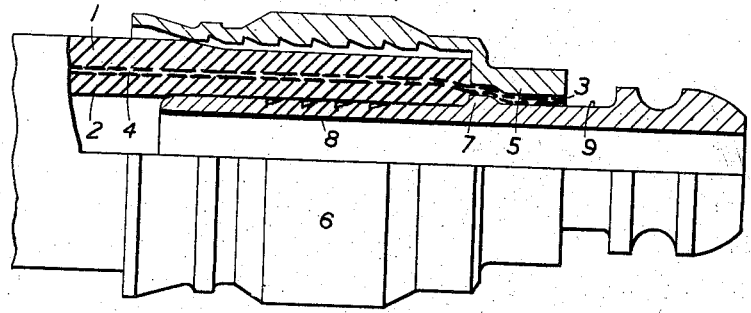
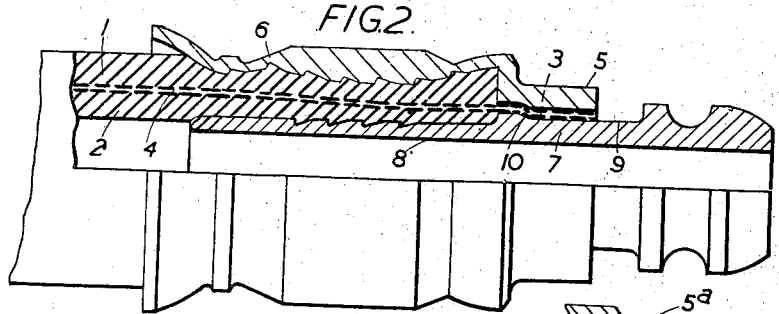
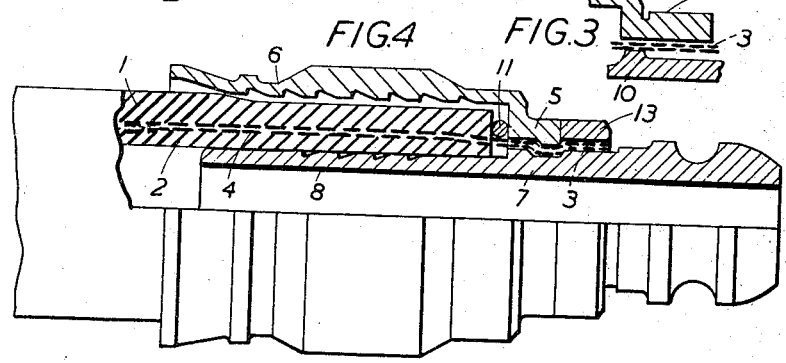
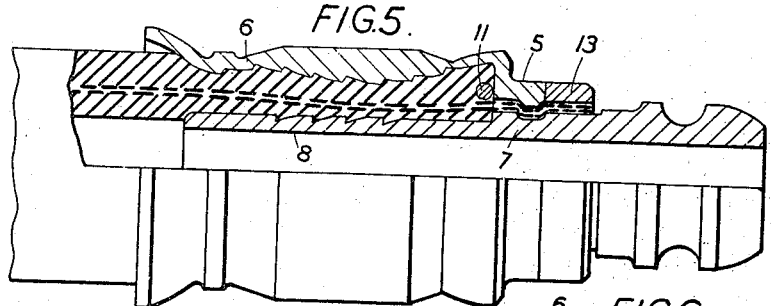
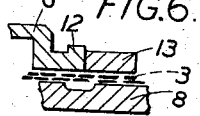
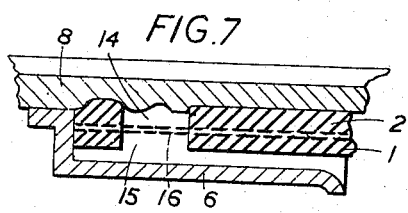
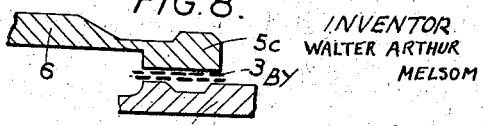
INVENTOR
WALTER ARTHUR MELSOM
BY
Albert F. Nathan
ATTORNEY Patented Apr. 24, 1945

2,374,224

UNITED STATES PATENT OFFICE 2,374,224

FLEXIBLE HOSE COUPLING

Walter Arthur Melsom, London, England, assignor to Bowden (Engineers) Limited, London, England, a company of Great Britain Application April 10, 1942, Serial No. 438,464
In Great Britain April 22, 1941

5 Claims. (Cl. 285—84)

The present invention relates to improvements in flexible hose coupling components comprising a flexible hose having tubular layers of resilient material such as rubber in various forms, natural or synthetic, reinforced by one or more tubular layers of flexible reinforcing material between such layers of resilient material, an inner rigid tubular insert and a sleeve which is made of a material suited to contraction such as brass, aluminium alloy, low carbon steel, or phosphor bronze, and is contracted to clamp the hose onto the insert (which may be of the same material as the sleeve) and which are suitable, and more particularly intended, for use with medium and high pressure hoses i. e., hoses suitable for pressures of from 500 lbs. per sq. in. upwards such as are employed for the hydraulic or pneumatic transmission of power or for the conveyance of gases, liquids, semi-solids or viscous substances under pressure where it is of great importance that the couplings shall neither blow off nor the anchoring stresses prove too severe for the hose material.

With couplings of this kind it is necessary to seal the hose to the insert sufficiently tightly to prevent the escape of any fluid and also to grip the hose between the sleeve and insert with sufficient force to prevent any risk of it being blown off axially by the internal fluid pressure, and the contracting pressure which must be exercised for the latter purpose usually exceeds that which is necessary to produce a fluid tight seal. This pressure may be so great that there is a danger of rupturing or unduly weakening the rubber walls of the hose, and this danger is increased when the rubber or other resilient material is of low elasticity, e. g., the so-called "short rubber" or certain rubber substitutes which are coming into use under war necessity.

According to the main features of the present invention I make a hose coupling component suitable for use with medium or high pressure hose comprising a flexible hose having tubular layers of rubber or like resilient material reinforced by a flexible layer or layers of metallic and/or textile material embedded between the layers of resilient material, a circumferentially continuous metallic sleeve and a rigid insert, wherein a portion of the hose including or consisting of the inner rubber or like layer and the surrounding reinforcing layer is gripped by contraction of the sleeve so as to form a sealing zone in which the hose is sealed fluid tightly against the insert, and wherein a portion of the layer (or of one of the layers) of the reinforcing material lying between such sealing zone and the end of the hose is bared of the rubber or like material both externally and internally prior to the contraction of the sleeve and by contraction of the sleeve is powerfully gripped between the sleeve and the insert without any portion of the rubber or like material in the hose intervening between the reinforcement and the gripping members.

I would have it understood that it is an essential feature of my invention that the pressure used in contracting the sleeve is such as to produce a permanent deformation thereof and when in this specification or its claims I speak of "contracting" the sleeve, I mean so contracting it as to permanently deform it.

The outer layer of rubber or resilient material may be removed at the sealing zone, but I prefer to leave this layer or the greater part of it on the hose in this zone, though I may reduce it slightly for the purpose hereinafter described.

Where a reinforcing layer is of a composite nature, which would in general be a metal reinforcement with adjacent fabric layer or layers, I may cut away these fabric layers or I may grip the composite layer as a whole between sleeve and insert. This would apply also to the other forms of composite layers.

When there are two or more separate reinforcing layers embedded in the hose with an intervening layer or layers of rubber or like material, I prefer to cut away one or more and the intervening rubber so that the sleeve and insert directly grip the same reinforcing layer, but in a variant form applicable where there is only a thin intervening rubber layer, I may bare the outer face of the outer layer and the inner face of the inner layer so that the sleeve grips the outer layer and the insert the inner layer, the thin intervening layer of rubber being forced into the interstices of the reinforcement or squeezed out to the side during the swaging operation.

When the reinforcing layer or layers is or are directly gripped according to my invention the resistance to relative axial displacement between the hose and the insert under the fluid pressure within the hose is very high and if the braiding is gripped before the contraction of the sleeve at the sealing zone the rubber or like material in such zone cannot flow and carry the braiding bodily with it and the flow of such material is accordingly restricted. By so anchoring the metal braiding the flow of the rubber when the sleeve is contracted must mainly take place relatively to the braiding and elongation of the hose lengths over standard sizes during manufacture is largely eliminated. This flow of the rubber relatively to the braiding is not such as practically to have any injurious results. The length of a finished piece of hose, e. g., one having a sleeve and insert at each end thereof, can therefore be regulated to closer tolerances as there is less elongation of the hose.

Preferably the sleeve and insert are separate parts and the bared end of the reinforcement is clamped directly between them. The insert may be peripherally grooved or recessed or ribbed, so that the sleeve in contracting, forces the bared braiding behind a locking shoulder. Separate sleeves and inserts may be interlocked axially, and if desired both axially and circumferentially, in the same operation as the clamping of the braiding. More than one groove or rib may be provided. If desired however one or more parts separate from the sleeve and insert may be used to engage the bared portion of the braiding, e. g., a separate ring may abut the sleeve and be contracted onto the braiding and the insert or may be contracted alongside a reduced neck portion of the sleeve which portion is also contracted onto the braiding, or a separate ring may be inserted between the sleeve and the braiding so as to be forced onto the braiding by the contraction of that portion of the sleeve. Such latter ring need not be made of metal but may be of compressed fibre, strong closely woven canvas, or other material which will contract sufficiently but will not flow readily like the rubber or rubber-like material of the hose.

The bared braiding is preferably clamped before, or in one operation with, the contraction of the sleeve around the hose but the clamping of the braiding may be effected as a subsequent operation.

The reinforcement generally found in medium and high pressure hose are of braided structure, and may be either of metal or textile material. I have found that a reinforcement consisting of a layer of braided metal, e. g., groups of high tensile steel wires braided to tubular form enclosed between two fabric layers (which may be either braided or woven) gives very good results when used for the purposes of our invention.

In the case where the grip of the sleeve or insert is on a layer of metal braiding we can achieve an added advantage, viz., electrical continuity for static earthing of the hose through such metallic braiding and the sleeve or insert.

Forms of hose couplings have been previously proposed in which the outer rubber layer of a hose having inner and outer layers of rubber or like material and an intermediate reinforcing layer is removed to expose the reinforcing layer externally for a portion of its length where it is gripped between hose and insert, but none of such proposals make any provision for baring the inner surface of such reinforcing layer, which forms an essential feature of my invention and claims.

Examples of coupling components according to the invention are illustrated in the accompanying drawing, in which Fig. 1 is a longitudinal elevation half in section of the parts of the coupling component before swaging, Fig. 2 is a similar view of the coupling component after swaging; Fig. 3 is a fragmentary view before the bared braiding is clamped, whilst Figs. 4 and 5 are similar half-sectional elevations before and after swaging of a modified form of the coupling component and Fig. 6 is a fragmentary view before the bared braiding is clamped. Fig. 7 is a fragmentary view of a modification, showing the parts before contraction, and Fig. 8 is a fragmentary sectional view of a form especially adapted for contraction in the same pass through a converging die as that in which the sealing zone is produced.

In one mode of procedure, I strip off the end part of the outer covering 1 and remove the end part of the inner covering 2 by known or approved means so as to leave the end part 3 of the metal braiding 4 bare and then pass the bare braiding in or through an axially aligned boss 5 of the sleeve 6 where it is caused to lie between such boss and the externally thickened part 7 of the insert 8 over which such boss engages when the insert is positioned in the hose end. An annular groove 9 is present in such thickened part so that the parts having been assembled and appropriately located with respect one to the other the boss is closed down upon the groove so that the metal of the boss 5 clamps the bared braiding 3 behind the wall 10 of the groove and between the insert and the boss of the sleeve thereby axially interlocking the insert, braiding and the sleeve against forces tending to force the insert out of the hose and securing the insert and sleeve against relative rotational movement, the metal braiding forming an admirable key for preventing such last mentioned movement. The boss is preferably provided with an external enlargement 5a around the groove, see Fig. 3. This closure of the boss may be effected by a convergent die, by rolling or by swaging dies which operate by closing in radially.

Hereafter, by any appropriate contracting method, e. g., by any of the methods just referred to and preferably by the steady pressure of radially moving dies, the work being usually given a part turn in between successive closing-in operations of the dies so as to avoid "flash," the sleeve is closed round the rubber covered end part of the hose so as to grip the hose between the sleeve and the insert with a pressure that need be no more than is sufficient to prevent leakage between the hose and the coupling. Alternatively the operations may take place simultaneously or in one operation. It may be desirable in some cases to thicken the end portion of the boss when contracting in one operation by a converging die, e. g., as shown at 5c, Fig. 8.

The baring of the braiding will generally not be such as to extend beyond or much beyond the inner end of the boss, a slight extension serving to make sure that the bared braiding is gripped up to the end of the sleeve.

With this form I prefer first to assemble the hose end into the sleeve until the rubber shoulder formed by baring the braiding abuts the end wall of the sleeve and the bared end of the braiding passes between the boss 5 of the sleeve and the thickened part 7 of the insert. For facilitating the operation the external surface of the outer rubber layer to be engaged by the sleeve is generally ground down as shown so as to provide an annular clearance space with the inside wall of the sleeve. This allows rubber displaced by the contracting operation at the sealing zone to flow towards the closed end of the sleeve and keep within the sleeve. The insert is now inserted into the hose and the sleeve, braiding and insert are swaged together as hereinabove described.

It has been found that when a length of the hose is cut off from stock the high tensile wire braiding has often some recovery value which leads to the unwanted result that that cut end of the braiding which could be regarded as the trailing end with respect to the haul off in the braiding operation expands while the other cut end contracts.

Such expanded cut end introduces the difficulty of passing it through the boss of the sleeve and such expansion may be prevented while the passage is taking place by a girdled constraint. For this purpose a metallic split ring 11 (Figs. 4 and 5) may be used by first slipping it over the expanded end in a sufficiently open state for this purpose and then closing it by a tool, e. g., a pair of pliers to constrain the wire braiding to assume the required diameter. Such a ring on passing the boss of the sleeve over the braided end is slidden along such braided end and remains behind the end wall of the sleeve. Such a split ring may by suitably proportioning the parts be made to serve the further purpose of locking the braiding behind the thickened part 7 of the insert. Other methods of constraint such as ferrules, springs, spring rings or the like may be employed.

The braiding may be axially interlocked with both walls of a groove in the insert, and this is facilitated, as shown in Fig. 6 by providing the boss where it lies around the groove with an end enlargement 12. A separate ring 13 may be provided over the end portion of the bared braiding which extends beyond the boss enlargement, which ring is contracted and grips this projecting portion and provides a finish to this part of the coupling component.

Fig. 7 shows a modified form of coupling component in which the sleeve is of uniform wall thickness and the outer and inner rubber layers are slotted at 14, 15 by stripping away the rubber at a point between the end of the hose and the sealing zone, so as to bare the reinforcement at 16. The sleeve is swaged down, e. g., by rolling or radially closing dies, with a sufficient pressure to clamp the bared part 16 against the insert. This form is more suited to the larger hoses owing to the difficulty of getting a tool inside the smaller bores to strip away the rubber of the inner tube. Alternatively, the sleeve around the bared part of the hose may have an external enlargement which is swaged by a converging die.

The sleeve may be formed and contracted in accordance with the invention the subject of my Patent No. 540,492 dated April 11, 1940.

Except that in accordance with the present invention the bared braiding is interlocked between the parts, the sleeve and insert may be pre-formed and united in accordance with the invention the subject of my Patent No. 540,491 dated April 11, 1940.

The coupling may be connected to a coupling nut by the usual method of passing it over the inner end of the insert up to a shoulder which co-operates with an inner diametral wall of the nut in which case the nut has to be passed onto the insert before the latter is connected to the sleeve or the nut may be secured to the insert as described in my Patents Nos. 540,489 and 540,490 dated April 10, 1940, in which case the nut may be passed on to the insert after the latter is connected to the sleeve.

What I claim is:

1. A hose coupling component suitable for use with medium or high pressure hose, comprising a flexible hose having tubular layers of rubber or like resilient material and at least one flexible layer of reinforcing material embedded between the layers of resilient material, a circumferentially continuous metallic sleeve and a rigid insert forming gripping members, a portion of said hose comprising at least the inner layer of resilient material and the surrounding reinforcing layer being gripped by contraction of the sleeve so as to form a sealing zone in which the hose is sealed fluid tightly against the insert, and a portion of the reinforcing material lying between said sealing zone and the end of the hose being bared of the rubber or like material both externally and internally prior to the contraction of the sleeve and by contraction of the sleeve being powerfully gripped between the sleeve and the insert without any portion of the rubber or like material intervening between the reinforcement and the gripping members.

2. A hose coupling component according to claim 1, in which the insert is peripherally grooved and the bared reinforcement material is pressed by the sleeve into the groove so as to interlock therewith.

3. A hose coupling component according to claim 1, in which the insert is provided with a peripheral abutment and the bared reinforcement is forced down to interlock with said abutment.

4. A hose coupling component according to claim 1, in which at least one separate gripping member located at the end of the sleeve directly engages one surface of the bared portion of the reinforcing material.

5. A hose coupling component according to claim 1, in which said insert is provided with a groove and said sleeve with a reduced end boss, the end of said boss being thickened where it lies around the groove in the insert, the boss being contracted onto the bared portion of the reinforcing material so that the latter is forced into the groove and is interlocked therewith, and a separate ring abutting the sleeve being contracted around the insert so as to clamp onto the insert an end portion of the bared reinforcing material extending beyond the groove therein.

WALTER ARTHUR MELSOM.